US010408236B2

(12) United States Patent
Knobloch

(10) Patent No.: US 10,408,236 B2
(45) Date of Patent: Sep. 10, 2019

(54) HYDRAULIC PRESSURE SUPPLY SYSTEM

(71) Applicant: AGCO International GmbH, Hesston, KS (US)

(72) Inventor: Juergen Knobloch, Immenhofen (DE)

(73) Assignee: AGCO International GmbH, Neuhausen (CH)

( * ) Notice: Subject to any disclaimer, the term of this patent is extended or adjusted under 35 U.S.C. 154(b) by 131 days.

(21) Appl. No.: 15/523,901

(22) PCT Filed: Nov. 4, 2015

(86) PCT No.: PCT/EP2015/075737
§ 371 (c)(1),
(2) Date: May 2, 2017

(87) PCT Pub. No.: WO2016/071411
PCT Pub. Date: May 12, 2016

(65) Prior Publication Data

US 2017/0314578 A1 Nov. 2, 2017

(30) Foreign Application Priority Data

Nov. 6, 2014 (GB) .................................. 1419777.6

(51) Int. Cl.

*F16D 31/02* (2006.01)
*F15B 11/16* (2006.01)
*E02F 9/22* (2006.01)
*F15B 11/20* (2006.01)

(52) U.S. Cl.

CPC .......... *F15B 11/165* (2013.01); *E02F 9/2235* (2013.01); *E02F 9/2246* (2013.01); (Continued)

(58) Field of Classification Search

CPC ..... F15B 11/165; F15B 11/167; E02F 9/2246; E02F 9/2296; F04B 17/05; F04B 49/20
See application file for complete search history.

(56) References Cited

U.S. PATENT DOCUMENTS 4,017,218 A 4/1977 Burk et al.
4,335,577 A 6/1982 Lobmeyer et al.
(Continued)

FOREIGN PATENT DOCUMENTS

EP 0111208 A2 6/1984
EP 0906993 A2 4/1999
(Continued)

OTHER PUBLICATIONS

European Patent Office, International Search Report for related International Application No. PCT/EP2015/075737, dated Mar. 3, 2016.

(Continued)

*Primary Examiner* — Michael Leslie

(57) ABSTRACT

A method of operating a variable displacement pump in a pressurized fluid supply system for an agricultural vehicle, including maintaining a constant displacement of the pump as rotational speed of the input drive to the pump increases to a first value of 1500 rpm and thereafter adjusting the displacement of the pump to maintain a constant output fluid flow 230 L/min or reduced flow as rotational speed of the input drive to the pump increases beyond the first value to a maximum value of 2100 rpm.

13 Claims, 2 Drawing Sheets

(52) U.S. Cl.
CPC ............ *E02F 9/2296* (2013.01); *F15B 11/20* (2013.01); *F15B 2211/20523* (2013.01); *F15B 2211/20546* (2013.01); *F15B 2211/20553* (2013.01); *F15B 2211/255* (2013.01); *F15B 2211/275* (2013.01); *F15B 2211/40* (2013.01); *F15B 2211/605* (2013.01); *F15B 2211/633* (2013.01); *F15B 2211/6323* (2013.01); *F15B 2211/6651* (2013.01); *F15B 2211/6652* (2013.01); *F15B 2211/6654* (2013.01)

(56) References Cited

U.S. PATENT DOCUMENTS

| | | | | |
|---|---|---|---|---|
| 5,630,317 | A | 5/1997 | Takamura et al. | |
| 5,784,883 | A | 7/1998 | Ohkura et al. | |
| 5,996,701 | A | 12/1999 | Fukasawa et al. | |
| 9,187,880 | B2 * | 11/2015 | Tsuruga | E02F 9/2296 |
| 2011/0240146 | A1 | 10/2011 | Kawasaki et al. | |
| 2014/0075930 | A1 | 3/2014 | Maiyur et al. | |

FOREIGN PATENT DOCUMENTS

| | | | |
|---|---|---|---|
| EP | 0922813 | A2 | 6/1999 |
| WO | 2012/058933 | A1 | 5/2012 |

OTHER PUBLICATIONS

UK Intellectual Property Office, International Search Report for UK Priority Application No. GB1419777.6, dated Apr. 27, 2015.

* cited by examiner

HYDRAULIC PRESSURE SUPPLY SYSTEM

BACKGROUND OF THE INVENTION

Field of Invention

The invention relates to a pressurized fluid supply system on an agricultural vehicle, especially a tractor, provided to supply various consumers on the vehicle and/or on an implement coupled with the vehicle.

Discussion of Related Art

Mobile fluid (hydraulic) supply systems are widely used to drive consumers on agricultural or construction vehicles, e.g. a tractor or a self-propelled harvester, or on implements attached thereto. These hydraulic systems are mostly provided with a pump supply, consumers, control valves and a tank to provide a fluid reservoir. The term “consumer” is used in the further description for hydraulic drives like rotary motors or linear rams but also for the respective control valves assigned to these drives. The term “control” in relation to supply systems hereby includes any adjustment of the supply system regarding direction, supply time or pressure of the fluid flow.

Variable displacement pumps (for example variable axial piston pumps of swashplate design) are characterized in that the displacement can be adjusted (by varying the swashplate angle) so that at low consumer demand, the output fluid flow and thereby the input power can be reduced to improve efficiency. FIG. 1 of the accompanying drawings is a graph showing at A the relationship between delivery (fluid output Q) and input speed (directly related to engine speed n) for maximum pivot angle of the pump. If the pump displacement V is kept constant (herein 85 $cm^3$ per revolution), the fluid flow is proportional to the input speed. The lower trace at B shows the same pump but with a different pivot angle/displacement.

In a hydraulic supply system the pump is drivingly connected to a primary power source (such as a combustion engine), so that the input speed of the pump depends on the engine speed which varies, although typically drivingly connected with a gearing between so that absolute rotational speeds of engine and pump are different. A known limiting factor of a pump installation is the input speed: exceeding a predetermined input speed and thereby fluid flow may firstly result in cavitation and then result in mechanical destruction due to excessive forces impacting pistons or breakdown of the lubrication film amongst other factors. These limits are influenced by design type and sizes.

Following this basic issue, most of the pumps installed in mobile hydraulic systems are specified to have the maximum allowable speed of the pump reached at the maximum engine speed (or slightly above for more security). With reference again to FIG. 1, the shown pump has the maximum fluid flow of 230 l/min at an engine speed of 2100 rpm (which may be a pump speed of 3500 rpm due to internal gear ratio).

For improving efficiency, it is a target to reduce the speed of the combustion engine so that fuel consumption is reduced. Looking at the hydraulic pump specification of FIG. 1, this may result in lower maximum hydraulic fluid flow. At a speed of 1700 rpm the fluid flow may only be 180 l/min so that the hydraulic system is undersupplied.

A countermeasure may be to install a pump offering higher fluid flow at a reduced engine speed, which pump is capable also for maximum engine speed, but this may result in a fluid flow at maximum engine speed which is higher than requested. Consequently, at high engine speeds, overpower would be supplied without being demanded. Furthermore the complete supply system must be designed to withstand the higher pressure load (pipe sections, filters, etc.). Changing the gearing ratio between engine and pump may solve the problem of insufficient fluid flow at low engine speeds but as above this will cause the problems of excessive fluid flow of the pump at higher input speed (cavitation and mechanical destruction).

OVERVIEW OF THE INVENTION

It is an object of the present invention to provide a pressurized fluid supply system for a vehicle which avoids at least some of the above-mentioned disadvantages.

In accordance with a first aspect of the present invention there is provided a pressurized fluid supply system for an agricultural vehicle comprising:

- a variable displacement pump for providing a fluid flow;
- an actuator coupled with the pump and controllably operable to vary the displacement with reference to a load sensing (LS) signal;
- a tank providing a fluid source to the pump;
- a primary power source coupled to provide a rotating input drive to the pump, the pump providing a first fluid flow rate at a first rotational speed of the input drive and a second fluid flow rate at a second rotational speed of the input drive, with the first rotational speed of the input drive being higher than the second rotational speed and the first fluid flow rate being higher than the second fluid flow rate; and
- a control system including means to determine a rotational speed of the input drive to the pump, characterized in that the control system is arranged to keep the pump output fluid flow rate at or below the first fluid flow rate at least partly on the basis of the determined rotational speed when the first rotational speed of the input drive is exceeded.

The control system is preferably arranged to determine a fluid flow demand on the pump.

Where the system comprises one or more spool valves controlling fluid flow from the pump to respective consumers on or connected with the vehicle, the fluid flow demand on the pump may be determined by measuring the spool position of the or each spool valve. Alternately, the control system may be coupled to receive a value for a fluid flow demand of an implement (coupled with the vehicle) via an ISOBUS connection. In a further option, where the variable displacement pump is an axial piston pump having a swashplate, the fluid flow demand on the pump may be determined by measuring a pivot angle of the swashplate.

If the fluid flow reaches a predetermined value, the control system may be arranged to limit the rotational speed of the input drive or the rotational speed of the primary power source or, if the variable displacement pump is an axial piston pump having a swashplate, the pivot angle of the pump to reduce delivery and prevent the predetermined (threshold) value from being exceeded.

In accordance with a further aspect of the invention there is provided a method of operating a variable displacement pump in a pressurized fluid supply system for an agricultural vehicle, comprising:

- providing a rotating input drive to the pump, the pump providing a first fluid flow rate at a first rotational speed of the input drive and a second fluid flow rate at a second rotational speed of the input drive, with the first rotational speed of the input drive being higher than the second rotational speed and the first fluid flow rate being higher than the second fluid flow rate, determining a rotational speed of the input drive to the pump, characterized by adjusting the pump displacement to keep the pump output fluid flow rate at or below the first fluid flow rate at least partly on the basis of the determined rotational speed when the first rotational speed of the input drive is exceeded. Preferably, the method further comprises maintaining a constant displacement of the pump as rotational speed of the input drive to the pump increases to the first rotational speed and thereafter adjusting the displacement of the pump to maintain a constant output fluid flow as rotational speed of the input drive to the pump increases beyond the first value. Alternately, the method may further comprise maintaining a constant rotational speed of the input drive to the pump when pump output fluid flow reaches a predetermined value.

Controlling a higher rated pump to prevent over-supply provides further benefits in complex systems or on production lines where several different ratings of pump may otherwise have to be specified. By specifying only the most highly rated, and performance limiting when using the pump for lower rating applications, cost savings from bulk discounts and avoidance of the need to inventorise and store multiple different pumps may be realised.

BRIEF DESCRIPTION OF THE DRAWINGS

Further features and advantages of the present invention will become apparent from reading the following description of embodiments of the invention, given by way of example only, with reference to the accompanying drawings in which.

DETAILED DESCRIPTION OF THE INVENTION

Figure 2:
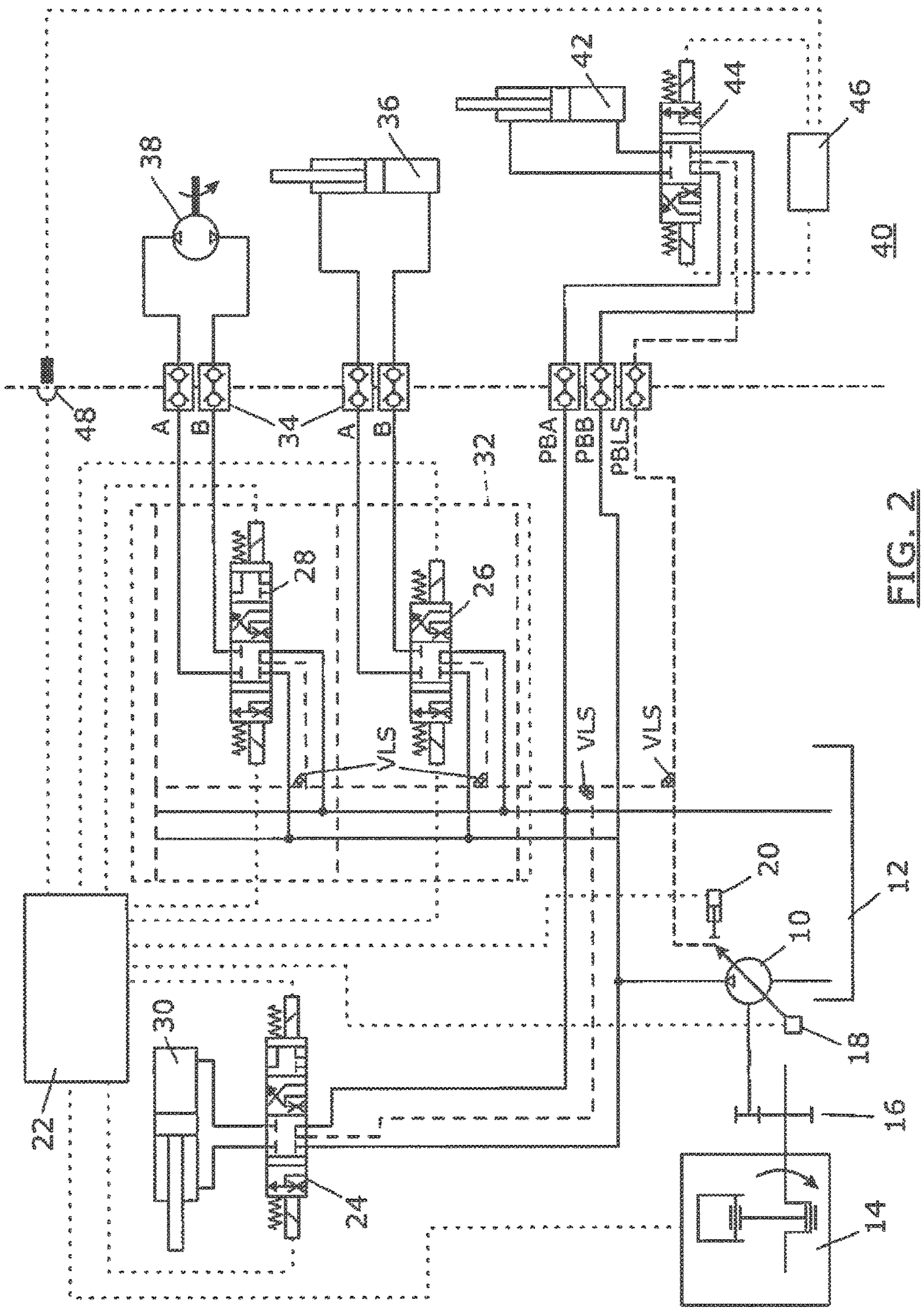
FIG. 2 is a schematic representation of a pressurized fluid supply system.

The components of a pressurized fluid supply system suitable to embody the invention are shown in FIG. 2. A variable displacement pump 10 is coupled with a tank 12 providing a source of hydraulic fluid. The pump 10 is driven by a primary power source (combustion engine in the example) 14 via a step up gearing 16 which increases the pump rotational speed relative to the engine speed. The pump 10 is provided with an actuator (integrated in the pump and not shown for clarity reasons) operable to vary the swashplate angle. A control system 22 is connected to the engine 14 in order to receive an indication of engine speed and also, for some embodiments, to control the same.

The output of the pump 10 is fed to a pressure line P of the system, and a return line R provides a discharge path back to the tank 12. A load sensing line LS (discussed further below) couples consumer control spool valves 24, 26, 28 of the vehicle and provides a demand line used to vary the displacement of the pump 10 via the actuator such as to meet the pressure demands of the consumers. A typical consumer on an agricultural vehicle such as a tractor is a double acting hydraulic cylinder 30 used to control movement of an implement hitch (not shown): depending on the spool position of control valve 24, the hitch may be raised, lowered, locked or allowed to float. As will be understood, the form of the spool valves 24, 26, 28 in terms of the connection configurations and number of positions will vary according to the needs of the consumer to be controlled, and each may have more or fewer positions than are shown in FIG. 2.

Others of the spool valves 26, 28 are provided in a valve manifold 32 which, via connectors 34, provides for controlled hydraulic supply to consumers 36, 38 on an implement 40 coupled to the vehicle. Additional consumers 42 with respective control valves 44 and controlled on-board by control means 46 of the implement (rather than directly by the control system 22 of the vehicle) may also be supplied by the pump in an arrangement known as Power Beyond. The implement control means 46 may be connected with the vehicle control system 22 via an ISOBUS data connection 48 for the transfer of data as will be discussed below.

Figure 1:
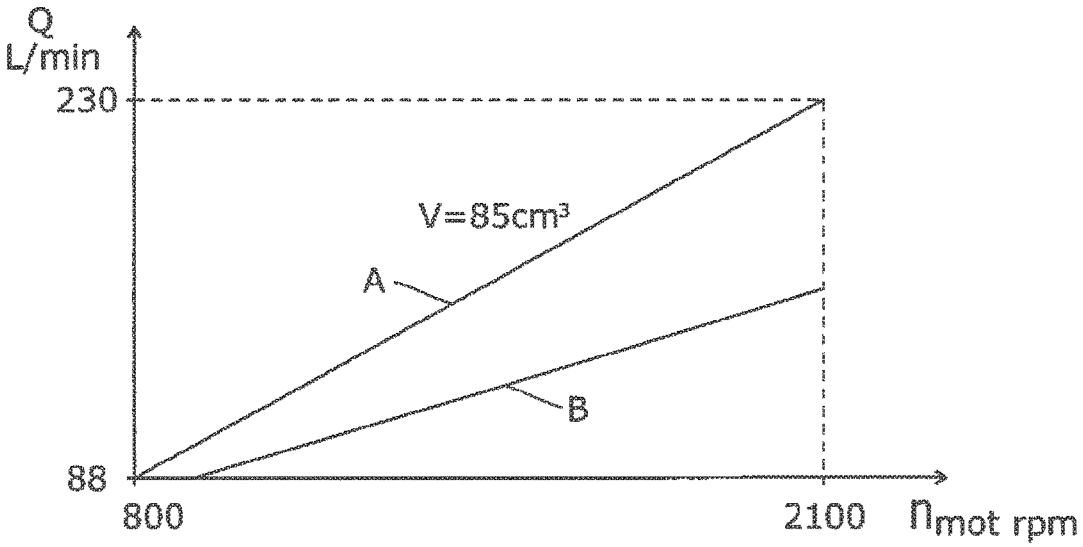
FIG. 1 is the graph of fluid output against engine speed for a conventional pump arrangement described previously.
Figure 3:
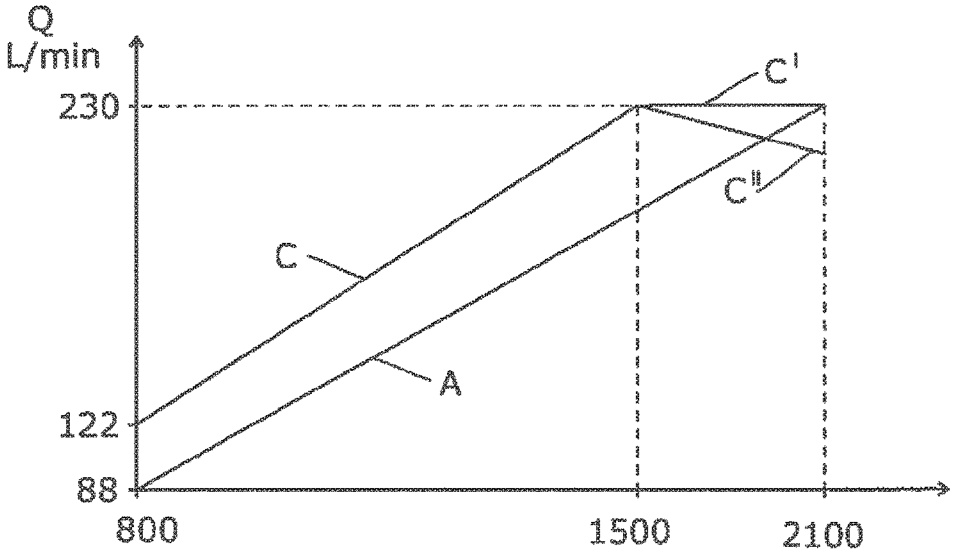
FIG. 3 is a graph of fluid output against engine speed for a pump operated according to one or more aspects of the present invention.

In operation, the fluid flow is constantly determined and limited by different methods based on a pump operation as shown in the graph of FIG. 3, whereby the trace at A is equivalent to the prior art trace A of FIG. 1 and the trace C shows a pump operation embodying a method according to the invention.

Compared to the pump characteristic map of trace A, the characteristic map of trace C reaches the maximum allowable fluid flow at an input speed of the pump which is lower than the input speed at maximum engine speed. As a consequence, the maximum engine speed would result in an unacceptable fluid flow level so that damage is likely.

A first operating method limits the engine speed when the maximum pump input speed is reached and the displacement of the pump is at maximum (in this situation the fluid flow is at maximum). In terms of the graph C of FIG. 3, the engine speed would be limited to 1500 rpm if the fluid flow reaches critical threshold level of 230 l/min. If the fluid flow is at a lower level at 1500 rpm (due to the pivot angle of the pump being not at maximum), the engine speed limit may be adapted to a higher value.

A second method reduces the pivot angle of the pump and thereby the displacement. In the graph of FIG. 3, at the engine speed of 1500 rpm (if the fluid flow is at threshold level of 230 l/min) the pump would be adjusted by limiting means 20 (FIG. 2) so that with increasing engine speed, the fluid flow would be kept constant at the 230 l/min threshold but not exceed it (trace C') or may be reduced to give a safety margin (trace C"). Therefore limiting means 20 adjust the pivot angle of the pump towards a smaller displacement so that an increasing input speed does not result in an oil flow increase.

As explained above, the actuator is controlled by the pressure signal (referred to as LS pressure signal) coming via load sensing line LS. Within the actuator the pressure signal of the load sensing line LS acts on the swashplate of the pump 10 and counteracts the pressure supplied by pump plus pressure differential (needed to keep the hydraulic circuit responsive). The actuator just varies the swashplate to generate a balance between the LS pressure and the sum of the pressures mentioned above. As long as these pressures are unbalanced, the swashplate is moved. If the pressure signal of the load sensing line LS is higher than pump pressure plus pressure differential, the swashplate is moved to higher displacement to increase oil flow. If pressure signal of the load sensing line LS is lower than pump pressure plus pressure differential, the swashplate is moved to lower displacement to reduce oil flow. If the pressures are balanced, the swashplate will be kept in position.

As the actuator according to prior art is adjusted solely by balance of pressures as described above, a concrete value for the pivot angle cannot presently be adjusted. To adjust the pump to a concrete pivot angle (and thereby to a defined fluid flow) limiting means 20 is provided. Limiting means 20 is connected to control system 22 and contains an adjustable mechanical stop counteracting the actuator of the pump. Limiting means 20 enables the system to stop, and also adjust, the pivot angle of the pump to a concrete value. The limiting means stops the swashplate if the pivot angle reaches a predetermined angle. In the case of FIG. 3 when the trace C reaches the threshold and will exceed this threshold with increasing engine speed, the limiting means 20 adjusts the swashplate to a pivot angle which avoids destruction of the pump. As indicated in FIG. 2, the limiting means 20 may comprise a hydraulic cylinder to move the stop. Alternatively the stop may be moved by electric linear drive (worm drive).

Both methods require the determination of the fluid flow in dependence on:

The pump input speed which is known from engine speed

The pivot angle of the pump.

The dependence of both can be stored in one or more characteristic maps so that, for example, the graph below trace C, C' in FIG. 2 is the operational range of the pump.

The engine speed is used for several purposes in modern tractors and can therefore be easily obtained. However, the pivot angle of the pump is not commonly measured in current systems and, referring back to FIG. 2, sensing means on the pump pivot axis or at the actuator adjusting the pump may not be present.

The displacement of the pump can indirectly be determined by measuring the demand of the consumers, respectively the control valves 24, 26, 28, which adjusts the pump 10. As most if not all of the valves are spool operated, the demanded fluid flow can be determined by spool position. The sum of all demands (plus losses) gives the overall demand which is forwarded to the limiting means. So knowing the demand is giving the pump adjustment or limitation as a direct measurement.

The LS system described above uses hydraulic pressure to forward the demand and adjust the pump. This is called hydraulic LS and is widely used due to the cheap and reliable installation. However, as mentioned above, current load sensing systems using hydraulic pressure are not capable of providing a value representative of consumers demand regarding fluid flow. Looking at FIG. 2 each spool valve 24, 26, 28 generates an LS pressure signal into load sensing line LS. As the branches of the load sensing line LS to each valve 24, 26, 28 are connected via shuttle valves VLS, the highest LS pressure signal is forwarded to the actuator. So the pressure signal does not indicate the sum of demands but only the highest. If the LS pressure signal generated by each spool valve 24, 26, 28 could be measured and forwarded to the control system, the control system 22 could then calculate the sum of demands regarding fluid flow to adjust limiting means 20. Such systems require high efforts.

As a further alternative, there are systems operating with an electronic LS signal. These electronic LS signals would be forwarded to the control system to determine the fluid flow demand of each consumer to adjust limiting means 20, but the system would be expensive.

Knowing pump adjustment and engine speed, the control system 22 for the variable displacement pump can ensure safe operation over the complete engine speed range with the main advantage that a lower specification pump can be installed which delivers more fluid at a lower engine speed level. In the scenario of FIG. 2, the pump producing trace C would deliver 122 l/min at an engine speed of 800 rpm compared to 88 l/min delivered by the pump represented by trace A, but maximum delivered flow is still at 230 l/min In practice a farmer may work a field with a plough. For maximum drag force, the engine speed may be at maximum level but, during ploughing, there is no need for hydraulic power. So limiting engine speed to limit hydraulic flow is not necessary. If during a headland manoeuvre, the power hydraulic flow demand increases to lift or turn the plough, the engine speed may be limited (or reduced) as maximum engine speed is not required in this situation (as drag forces are minor on the headland). If a CVT is used, the tractor need not even reduce speed as gears can be changed continuously.

As mentioned above, the pivot angle can be determined indirectly (by consumer demand or spool position) or directly by measuring the pivot angle. In terms of cost, determining the pivot angle indirectly would be preferred as the pivot angle sensor (18; FIG. 2) is not needed. However, there are operating conditions in modern tractors wherein the consumer demand cannot be determined by spool position, especially tractors operated with the above-mentioned Power Beyond supply systems which suffer from the fact that the implement is supplied with “uncontrolled” fluid flow with the control valves being placed on the implement. The demand may still be fed back via Load Sensing LS, but the spool position of the valves 44 being operated on the implement 40 is unknown. So this may require the sensor 18 to determine the pivot angle of the pump. Alternatively, an implement connected via Power Beyond may forward the fluid flow demand (from spool positions and including loses etc.) of the implement via ISOBUS connection 48.

In the foregoing the applicants have described a method of operating a variable displacement pump in a pressurized fluid supply system for an agricultural vehicle, comprising maintaining a constant displacement of the pump as rotational speed of the input drive to the pump increases to a first value and thereafter adjusting or limiting the displacement of the pump to maintain a constant output fluid flow as rotational speed of the input drive to the pump increases beyond the first value to a maximum value.

From reading the present disclosure, other modifications will be apparent to persons skilled in the art. Such modifications may involve other features which are already known in the field of agricultural machines and component parts thereof and which may be used instead of or in addition to features already described herein.

The invention claimed is:

1. An agricultural vehicle comprising:

at least one hydraulic consumer;

a variable displacement pump for providing a fluid flow to the at least one hydraulic consumer;

an actuator coupled with the pump and controllably operable to vary the pump displacement with reference to a load sensing signal providing a load sensing adjustment of the pump;

a tank providing a fluid source to the pump;

a primary power source coupled to provide a rotating input drive to the pump, the pump providing an output fluid flow at a first fluid flow rate at a first rotational speed of the input drive and a second fluid flow rate at a second rotational speed of the input drive, with the first rotational speed of the input drive being higher than the second rotational speed and the first fluid flow rate being higher than the second fluid flow rate; and a control system comprising a sensor to determine a rotational speed of the input drive to the pump, wherein the control system is arranged to keep the pump output fluid flow rate at or below the first fluid flow rate at least partly on the basis of a determined rotational speed of the input drive when the first rotational speed of the input drive is exceeded, wherein the control system is configured to vary the fluid flow from the pump without changing a rotational speed of the primary power source.

2. The agricultural vehicle of claim 1, wherein the control system is arranged to determine a fluid flow demand on the pump.

3. The agricultural vehicle of claim 2, comprising at least one of a plurality of spool valves controlling the fluid flow rate from the variable displacement pump to at least one of a plurality of respective consumers on or connected with the vehicle, wherein the fluid flow demand on the pump is determined by measuring a spool position of each spool valve.

4. The agricultural vehicle of claim 2, wherein the control system is coupled to receive a value for the fluid flow demand of an implement on or connected with the vehicle, via an ISOBUS connection.

5. The agricultural vehicle of claim 2, wherein the variable displacement pump is an axial piston pump having a swashplate and the fluid flow demand on the pump is determined by measuring a pivot angle of the swashplate.

6. The agricultural vehicle of claim 1, wherein the control system is further arranged to limit the rotational speed of the input drive if the fluid flow rate reaches a predetermined value.

7. The agricultural vehicle of claim 1, wherein the control system is further arranged to limit a rotational speed of the primary power source if the fluid flow rate reaches a predetermined value.

8. The agricultural vehicle of claim 1, wherein the variable displacement pump is an axial piston pump having a swashplate and the control system is arranged to limit a pivot angle of the pump to reduce delivery if the fluid flow rate reaches a predetermined value.

9. The agricultural vehicle of claim 1, wherein the variable displacement pump is an axial piston pump having a swashplate and the control system is arranged to adjust a pivot angle of the pump depending on a determined fluid flow rate, by a limiting mechanical stop, counteracting the load sensing adjustment of the pump.

10. A method of operating a variable displacement pump providing a fluid flow in an agricultural vehicle, comprising:

providing a rotating input drive to the pump, the pump providing an output fluid flow at a first fluid flow rate and a first rotational speed of the input drive and a second fluid flow rate at a second rotational speed of the input drive, with the first rotational speed of the input drive being higher than the second rotational speed and the first fluid flow rate being higher than the second fluid flow rate;

determining a rotational speed of the input drive to the pump; and adjusting the pump displacement to keep the pump output fluid flow rate at or below the first fluid flow rate at least partly on the basis of a determined rotational speed when the first rotational speed of the input drive is exceeded.

11. The method of claim 10, further comprising maintaining a constant displacement of the pump as the rotational speed of the input drive to the pump increases to the first rotational speed and thereafter adjusting the displacement of the pump to maintain a constant output fluid flow rate as the rotational speed of the input drive to the pump increases beyond the first rotational speed.

12. The method of claim 10, further comprising maintaining a constant rotational speed of the input drive to the pump when the pump output fluid flow rate reaches a predetermined value.

13. The agricultural vehicle of claim 1, wherein the control system is arranged to control the pump to provide:

a flow rate at the first fluid flow rate when the primary power source is rotating the input drive at the first rotational speed; and a flow rate below the first fluid flow rate when the primary power source is rotating the input drive at the second rotational speed.

* * * * *